12. United States Patent Office 2,978,727
Patented Apr. 11, 1961

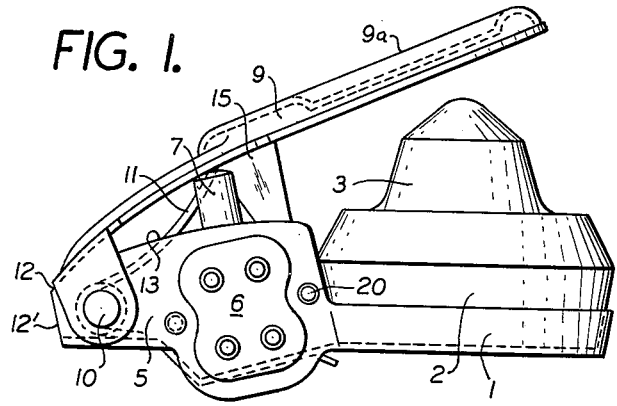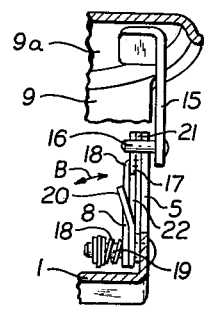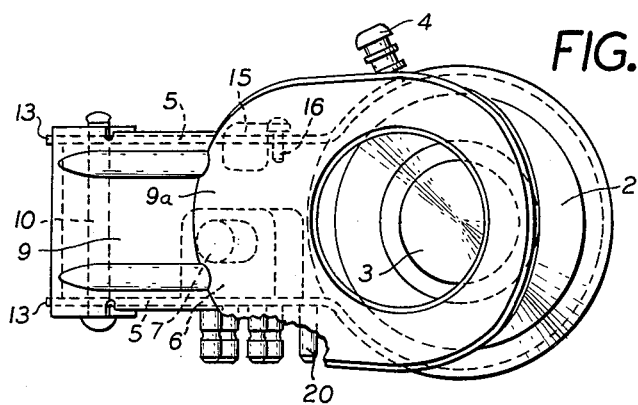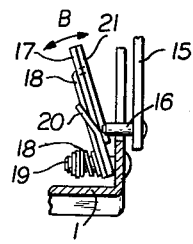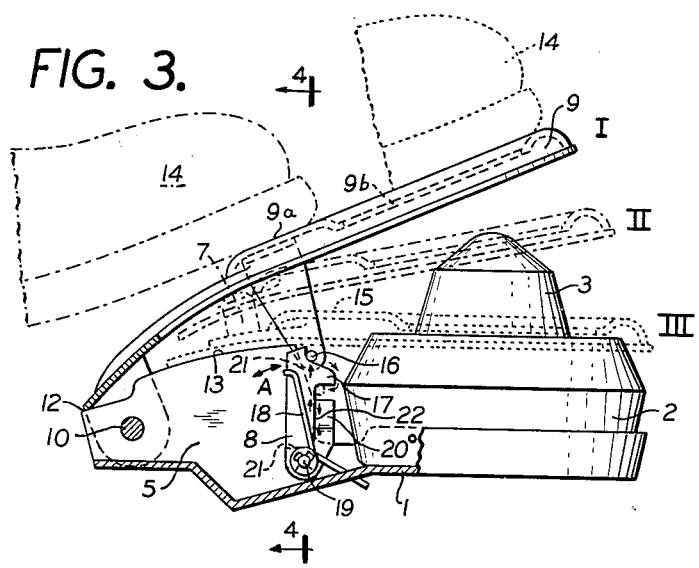

2,978,727
APPARATUS FOR OPERATION OF WINDSHIELD CLEARING DEVICES ON AUTOMOTIVE VEHICLES

Johann Förster, Frankfurt am Main, Germany, assignor to Fa. VDO Tachometerwerke Adolf Schindling G.m.b.H., Frankfurt am Main, Germany, a corporation of Germany Filed June 7, 1960, Ser. No. 34,553
3 Claims. (Cl. 15—250.02)

The present invention relates to an apparatus for operation of windshield clearing devices on automotive vehicles, which comprises substantially a foot-actuated pump having a pressure extension for feeding the clearing fluid and a foot-controlled lever disposed thereabove for operation of an electric switch for the drive of the window wiper, and which may be controlled by the foot of the motorist.

Windshield clearing devices for automotive vehicles are known which comprise a foot-actuated pump having a pressure body for feeding the clearing fluid, in which a spring-biased, electrical switch for the drive of the window wiper is incorporated. In accordance with another known structure, the switch is arranged separately from the foot-actuated pump, yet both devices are operable by a foot-actuated lever swingable against the force of a spring. In the known structures, the drive for the window wiper alone can be switched on by slight pressure of the foot on the pressure body of the pump and on the foot-actuated lever, respectively. Since the switches for the window wipers are formed as holding switches, the slight foot pressure must be maintained during the entire period during which the window wipers alone are in operation. Upon exerting a greater foot pressure, however, the pump also is put into operation and a feeding of the clearing fluid is brought about.

The known structures have, therefore, the drawback that the pump cannot be excluded, due to the non-sensitivity of the foot-operation, that even if the window wipers alone should be operated, that still a pressure is exerted on the foot-actuated pump and a small quantity of fluid is still conveyed. A further drawback resides in the fact that for permanent operation of the window wiper, an additional switch must be provided on the dashboard in addition to the foot-actuated switch, which additional switch is formed as a resting switch.

It is one object of the present invention to provide an apparatus for operation of windshield clearing devices on automotive vehicles, wherein the drawbacks set forth above are eliminated.

It is another object of the present invention to provide an apparatus for operation of windshield clearing devices on automotive vehicles, which comprises a foot-actuated lever causing upon operation merely the switching of a switch for the drive of the window wiper, and which has a recess through which the pressure attachment of the foot-actuated pump can project during the partly or completely performed depression of the foot-actuated lever. The latter cannot, thereby provide a feeding of the cleaning fluid by the pump in any one of the possible lever positions. This requirement is fulfilled by the design and the arrangement of the lever and is secured by an abutment member, which limits the movement of the lever in downward direction without engagement of the foot-operated pump.

It is yet another object of the present invention to provide an apparatus for operation of windshield clearing devices on automotive vehicles, which permits the arrangement of a resting device in the apparatus, which resting device serves the purpose to start and stop, respectively, the operation of the window wiper. By this arrangement, the foot-operated lever may be retained in the operating position for the drive of the window wiper after passing the first portion of its moving path. Upon repeat depression, the resting device releases again the foot-actuated lever, the switch breaks the circuit and the window wiper stops operation. The continuous drive of the window wiper can be achieved and maintained likewise by means of the foot-actuated lever, so that the switch on the dashboard, which was necessary in known structures, is no longer required.

The structure designed in accordance with the present invention brings about the following advantages:

In the known clearing devices of this type, the motorist depresses with his left foot the foot-actuated lever of the clearing device and, as a rule, simultaneously with his right foot the brake, in case of a sudden soiling of the windshield. It is, however, then necessary to remove the left foot from the foot-actuated lever of the clearing device, and in view of the speed reduction of the vehicle, he must depress the clutch lever in order to shift to another speed. Due to this necessity, the window wipers stop immediately the operation, since the switch in the known structures is formed merely as a holding switch, without continuation of the operation until the windshield is cleaned completely. Even during the operation of the clearing device, without the necessity of a speed reduction of the vehicles, in the known structures the foot must depress the foot-actuated lever for such a time period required for the finishing of the fluid spraying operation.

In operation of the structure according to the present invention, however, the window wipers continue their operation upon finishing the fluid spray operation, without requirement that the motorist depress an operating member and the window wipers may be stopped, as desired, by means of a short depression on the foot-actuated lever, due to the release of the operating lever from its resting position. It is, however, necessary to adjust slightly the position of the foot, so that upon renewed depression of the lever, the pressure attachment of the foot-operated pump is not engaged. Since this single step of the motorist is performed at a time at which, as a rule, no dangerous traffic condition exists, such step can easily be performed. As set forth above, there is, of course, also the advantage of the continuous operation of the window wiper at will, and the elimination of the hand switch on the dashboard.

With these and other objects in view, which will become apparent in the following detailed description, the present invention will be clearly understood in connection with the accompanying drawings, in which:

Figure 1 is a side elevation of the apparatus for operation of windshield clearing devices on automotive vehicles;

Fig. 2 is a top plan view thereof;

Fig. 3 is a side elevation of the apparatus shown in Fig. 1, however, parts being shown in section;

Fig. 4 is a section along the lines 4—4 of Fig. 3; and

Fig. 5 is a fragmentary section along the lines 4—4 of Fig. 3, showing the notch carrying member 8 in a different operating position.

Referring now to the drawings, the apparatus designed in accordance with the present invention comprises a supporting part 1 drawn out of sheet metal which carries a foot-actuated pump 2, rubber-bellows having a pressure projection 3, and a lateral nipple 4 to be connected with a hose feeding the pressure fluid. One of two webs 5, which are bent upwardly substantially perpendicularly to the bottom face of the carrier part 1, has secured thereto a four-pole switch 6 with a spring-biased pressure head 7, and the other of the two webs 5 has mounted thereon a notch carrying member 8. A foot-actuated lever 9 is also pivotally mounted on the two webs 5. The foot-actuated lever 9 can swing about an axle 10 extending crosswise through both webs 5 against the force of a return spring 11. This swinging stroke of the foot-actuated lever 9 is limited in upward direction by the abutment of the short lever arm on the upper edge face 12 of the rear wall of the carrier part 1 and in downward direction by abutment of the long lever arm with the upper edge faces 13 of the webs 5. Fig. 3 shows the foot-actuated lever 9 in full lines in the upper limit position I, in point-dotted lines in the median position II and in dotted lines in the lower limit position III, respectively.

The upper foot board face 9a of the foot-actuated lever 9 has an opening 9b, through which the pressure projection 3 of the foot-actuated pump 2 can pass through, upon depression of the foot-actuated lever 9, so that the latter can be depressed into the lower abutment position III, by means of the front end 14 of the foot or of the shoe, without engaging the pressure projection 3. The foot-actuated lever 9 has a downwardly extending projection 15 which carries a crosswise disposed pin 16 opposite the notch carrying member 8 having a tooth 17. The pin 16 normally engages one side of the tooth 17 of the member 8. The latter is swingable against the pressure of a helical spring 18, in known manner, about an axle 19 secured to the corresponding web 5 and additionally movable out of a plane substantially perpendicularly to the axle 19 into a plane disposed at an acute angle toward the axle 19, as shown in Fig. 5, simultaneously compressing the spring 18. In order to permit the latter movement, the bore in the member 8, receiving the axle 19, is larger than it would be required for a swinging movement about the axle 19. The tooth carrying member 8 has formed therewith a small plate 20°, the upper end of which is bent laterally, as shown in Figs. 4 and 5, and also has in addition to the tooth 17, a guide ledge 21 which forms a straight edge 22, for a purpose described below.

A fitting pin 20 projecting from the corresponding other web 5 and disposed adjacent the plug pins of the switch 6 prevents an error in the plug junction.

The present apparatus operates in the following manner:

Upon depressing the foot-actuated lever 9 by means of the front point of the foot, the pressure head 7 is depressed and the circuit for the drive of the window wipers is closed. The switch 6 operates at first as a holding switch, so that a plurality of wiping movements can be performed if the foot-actuated lever 9 is now in any position within the range of positions between the position limits I and II (Fig. 3), and upon release of the foot-actuated lever 9, the window wipers are set to rest immediately. If the foot-actuated lever 9 is depressed into the position II (Fig. 3), the locking tooth carrying member 8 locks the pin 16 therebelow, so that the window wipers operate continuously without further depression of the lever 9 by means of the foot, until the foot-actuated lever 9 is pressed down to the position III to release the pin 6 from the tooth 17, and when released the window wipers are switched off. The downward swinging movement of the lever 9 from the position I through the position II into the position III thus permits the foot operated position, the continuous operation without foot pressure, and the release or switch off, respectively, of the window wipers. The pin 16 engages in the position I of the foot lever the edge face of the tooth carrying member 8 above the tooth 17. During the downward swinging movement of the lever 9 the pin performs a circular path about the axle 10 as its center and pushes the member 8 counter-clockwise, in the direction of the arrow A, against the force of the spring 18 due to its riding on the inclined upper face of the tooth 17. Upon reaching the lowermost point of said upper face of the tooth 17 and slight further pressing on the lever 9, the pin 16 reaches a point below the tooth 17, and the member 8 will return to the original position, by operation of the spring 18, yet, the lever 9 remains now locked in the position II, even upon removal of the foot therefrom, and provides automatic continuous operation of the window wipers.

If now the lever is pressed down further by foot actuation into position III, the pin 16 rides further down along the edge 22 of the member 8 and engages the laterally bent plate 20 of the member 8 and moves the latter from a substantially vertical position into an inclined position, in the direction of the arrow B, against the helical spring 18 which is now compressed, as shown in Fig. 5, until the pin 16 slides off the edge 22 of the member 8. Then the latter is returned by clockwise movement in direction of the arrow B (Fig. 5) until the pin 16 engages the edge of a guide ledge 21 (shown in dotted lines in Fig. 3). Upon release of the lever 9, the pin 16 rides upwardly along the guide ledge 21. During the latter movement, the member 8 continues its clockwise movement and the pin 16 bypassing the tooth 17 leaves the guide ledge 21, whereupon the member 8 engages the corresponding web 5 to assume its original position. Thus it is required to press down the lever into position III, to return the pin 16 into its position I and to bypass the tooth 17. Any position of the lever 9 and of the pin 16, respectively, between the positions I and III would lock the pin 16 below the tooth 17. By this arrangement a wide play is provided without sensitivity for the foot actuation of the switch for the window wipers.

If the clearing of the windshield is to be combined with spraying a cleaning fluid thereon, the pump is put into operation by repositioning the foot into an advanced position, whereby upon termination of the fluid spray, the window wipers remain in operation and then, as desired, upon return of the foot into the original position with withdrawn front end of the foot, as set forth above, are switched off. The force of the spring 11 is slight, so that it can easily be overcome by the pressure of the point of the foot, while the operation of the pump requires a comparatively stronger foot pressure.

While I have disclosed one embodiment of the present invention, it is to be understood that this embodiment is given by example only and not in a limiting sense, the scope of the present invention being determined by the objects and the claims.

I claim:

1. An apparatus for operation of windshield clearing devices on automotive vehicles comprising a pump having a pressure extension for operating the pump for the feeding of cleaning fluid, a foot actuated lever, an electric switch adapted to control the windshield wiper drive, said foot actuated lever operating solely said electric switch, and said foot operated lever having an opening at least complementary to said pressure extension of said pump, said pressure extension projecting through said opening upon depression of said foot actuated lever.

2. The apparatus, as set forth in claim 1, which includes an abutment member limiting the depression stroke of said foot actuated lever.

3. The apparatus, as set forth in claim 1, which includes means for locking said foot lever, after the latter has passed a first portion of its depression stroke to a position in which said electric switch is in its operative position, and means releasing said locking means upon further depression of said foot actuated lever.

References Cited in the file of this patent

UNITED STATES PATENTS

| 2,724,855 | Olin | Nov. 29, 1955 |
| 2,870,476 | Oishei | Jan. 27, 1959 |
| 2,876,483 | Neufeld | Mar. 10, 1959 |